United States Patent
Karwa et al.

(10) Patent No.: US 12,493,672 B1
(45) Date of Patent: Dec. 9, 2025

(54) SYSTEM, METHOD, AND COMPUTER PROGRAM FOR DIRECT API CALL AUTHENTICATION DURING AN END-TO-END TEST FLOW

(71) Applicant: Amdocs Development Limited, Limassol (CY)

(72) Inventors: Ruchita Karwa, Pune (IN); Vladimir Tkach, Kefar Yona (IL); Ayush Srivastava, Pune (IN)

(73) Assignee: AMDOCS DEVELOPMENT LIMITED, Limassol (CY)

(*) Notice: Subject to any disclaimer, the term of this patent is extended or adjusted under 35 U.S.C. 154(b) by 0 days.

(21) Appl. No.: 18/236,840

(22) Filed: Aug. 22, 2023

(51) Int. Cl.
G06F 21/31 (2013.01)
G06F 11/3668 (2025.01)
H04L 43/50 (2022.01)

(52) U.S. Cl.
CPC .......... G06F 21/31 (2013.01); G06F 11/3672 (2013.01); H04L 43/50 (2013.01)

(58) Field of Classification Search
CPC ....... G06F 21/31; G06F 11/3672; H04L 43/50
USPC ........................................................ 709/224
See application file for complete search history.

(56) References Cited

U.S. PATENT DOCUMENTS

| | | | | |
|---|---|---|---|---|
| 2014/0026203 A1* | 1/2014 | Ho | ........................ | H04L 63/168 726/9 |
| 2019/0057204 A1* | 2/2019 | Marcovecchio | ...... | H04L 67/146 |
| 2019/0294527 A1* | 9/2019 | Teitelbaum | ........... | H04L 63/083 |
| 2020/0133829 A1* | 4/2020 | Zazo | ................... | G06F 11/3692 |
| 2021/0049267 A1* | 2/2021 | Wu | ........................ | G06F 21/554 |
| 2021/0360083 A1* | 11/2021 | Duggal | ................... | H04L 67/34 |
| 2022/0245060 A1* | 8/2022 | Kathuria | ............. | G06F 11/3684 |

* cited by examiner

*Primary Examiner* — Liang Che A Wang
*Assistant Examiner* — Ayele F Woldemariam
(74) *Attorney, Agent, or Firm* — Zilka-Kotab, P.C.

(57) ABSTRACT

As described herein, a system, method, and computer program are provided for direct API call authentication during an end-to-end test flow. During use of an end-to-end testing framework, a network log is stored that includes an authentication token issued by an identity provider. The authentication token is then used for making a direct API call during a test flow of the end-to-end testing framework.

5 Claims, 6 Drawing Sheets

SYSTEM, METHOD, AND COMPUTER PROGRAM FOR DIRECT API CALL AUTHENTICATION DURING AN END-TO-END TEST FLOW

FIELD OF THE INVENTION

The present invention relates to execution of end-to-end test flows.

BACKGROUND

Most known companies use end-to-end test flows to provide a full test scenario for their web applications. However, because direct application programming interface (API) calls from the end-to-end tests are not employed, these end-to-end test flows takes a lot of time in complex test suites since they require a full simulation of a human behavior.

To date, end-to-end test flows have not been able to use direct API calls due to the inaccessibility of required authentication tokens. In particular, when a third party's identity provider (IDP) is used for an authentication flow in web application, trust is created between the source and target platforms. After successful authentication, IDP provides tokens to create the contract between the two platforms. During development, the contract with this IDP must be built for authentication in the local/test environment, which can be configured well through IDP configuration. As result, the authentication token will be stored in a local storage. Unfortunately, a direct API call which requires the authentication token will attempt to locate the authentication token in the browser.

There is thus a need for addressing these and/or other issues associated with the prior art. For example, there is a need to provide direct API call authentication during an end-to-end test flow.

SUMMARY

As described herein, a system, method, and computer program are provided for direct API call authentication during use of an end-to-end testing framework, a network log is stored that includes an authentication token issued by an identity provider. The authentication token is then used for making a direct API call during a test flow of the end-to-end testing framework.

DETAILED DESCRIPTION

Figure 1:
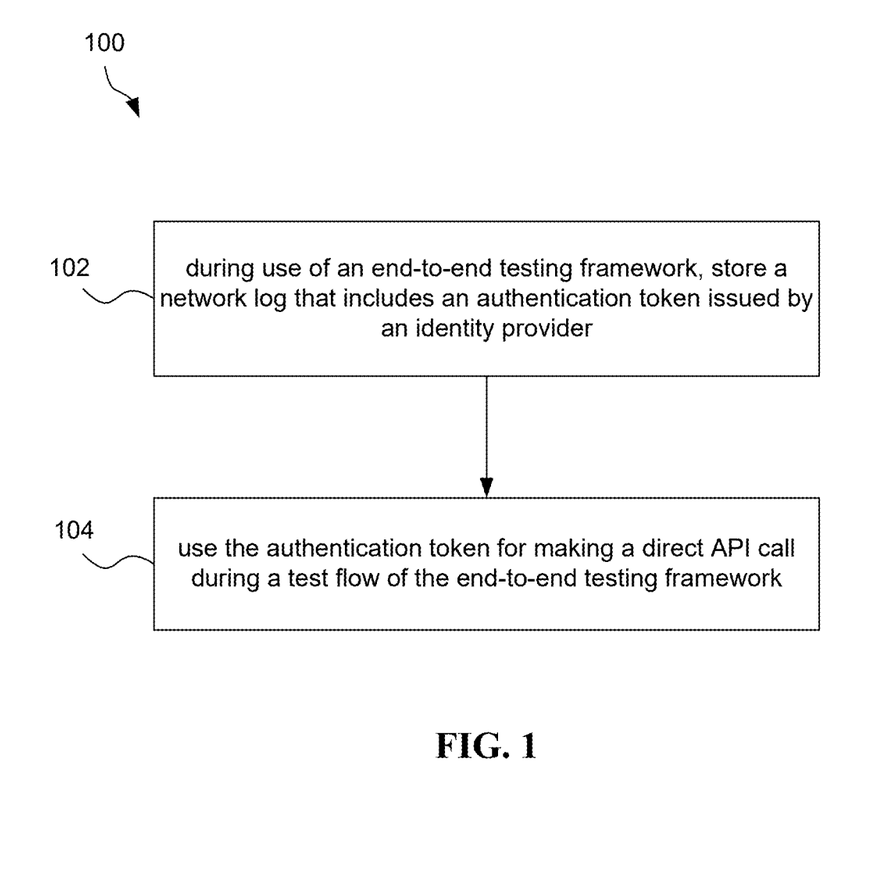
FIG. 1 illustrates a method for direct API call authentication during an end-to-end test flow, in accordance with one embodiment.

FIG. 1 illustrates a method 100 for direct API call authentication during an end-to-end test flow, in accordance with one embodiment. The method 100 may be carried out by a computer system, such as that described below with respect to FIGS. 5 and/or 6. For example, the method 100 may be performed by a computer system executing an end-to-end testing framework. With respect to the present description, the end-to-end testing framework refers to a platform, or collection of applications, processes, etc., that provides end-to-end testing of web applications. The end-to-end testing includes evaluating the entire application flow of a web application, from start to finish, to ensure that all components work as expected and the web application functions correctly in real-world scenarios.

Returning to the method 100, in operation 102, during use of the end-to-end testing framework, a network log is stored that includes an authentication token issued by an identity provider. Use of the end-to-end testing framework refers to execution of one or more test flows as a part of end-to-end testing of a web application. The test flows are executed via corresponding tests configured within the end-to-end testing framework. In an embodiment the test flows are executed through a browser.

The network log refers to a log, or record, of information transmitted during the use of the end-to-end testing framework. In an embodiment, the network log includes metadata sent from the browser to a server during use of the end-to-end testing framework. For example, the metadata may be sent by the browser via at least one of the test flows.

The end-to-end testing framework may be configured to store the network log, in an embodiment. In an embodiment, the end-to-end testing framework may be configured to store the network log in a defined location. For example, the network log may be stored locally with respect to the browser, remotely with respect to the browser, stored in memory, or in another other defined location.

As mentioned, the network log includes an authentication token issued by an identity provider. The identity provider refers to a third party that provides an authentication service. In an embodiment, the web application is configured to use the authentication service. The authentication service operates to provide an authentication token to a source upon authentication of the source (e.g. upon successful login by the source). The authentication token may then be used by the source to authenticate itself when communicating with another entity.

In an embodiment, the authentication token may be issued when the browser logs in to a restricted page via a test flow. In an embodiment, the authentication token may be contained in a request header. For example, the request header may be a component of a communication sent by the browser, and may accordingly be logged as a part of that communication.

In operation 104, the authentication token is used for making a direct API call during a test flow of the end-to-end testing framework. The test flow mentioned herein may be different from the test flow via which the authentication token is issued. The test flow described herein refers to a test flow of the end-to-end testing framework that employs a direct API call (e.g. to a destination) which requires the authentication token.

In an embodiment, the authentication token is parsed from the network log for use in making the direct API call during the test flow. In an embodiment, the authentication token is stored in an instance for use by the direct API call during the test flow. Use of the authentication token may refer to including the authentication token with the direct API call in order to authenticate the source of the direct API call to the destination (recipient) of the direct API call.

To this end, the method 100 operates to provide direct API call authentication during an end-to-end test flow. As noted above, the direct API call authentication is achieved by using a first test flow to have an authentication token issued, enabling logging within the end-to-end testing framework so that the authentication token is logged in a network log, and then retrieving the logged authentication token for use when making a direct API call during another test flow of the end-to-end testing framework. In this manner, the authentication token can be made accessible for use by the other test flow.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
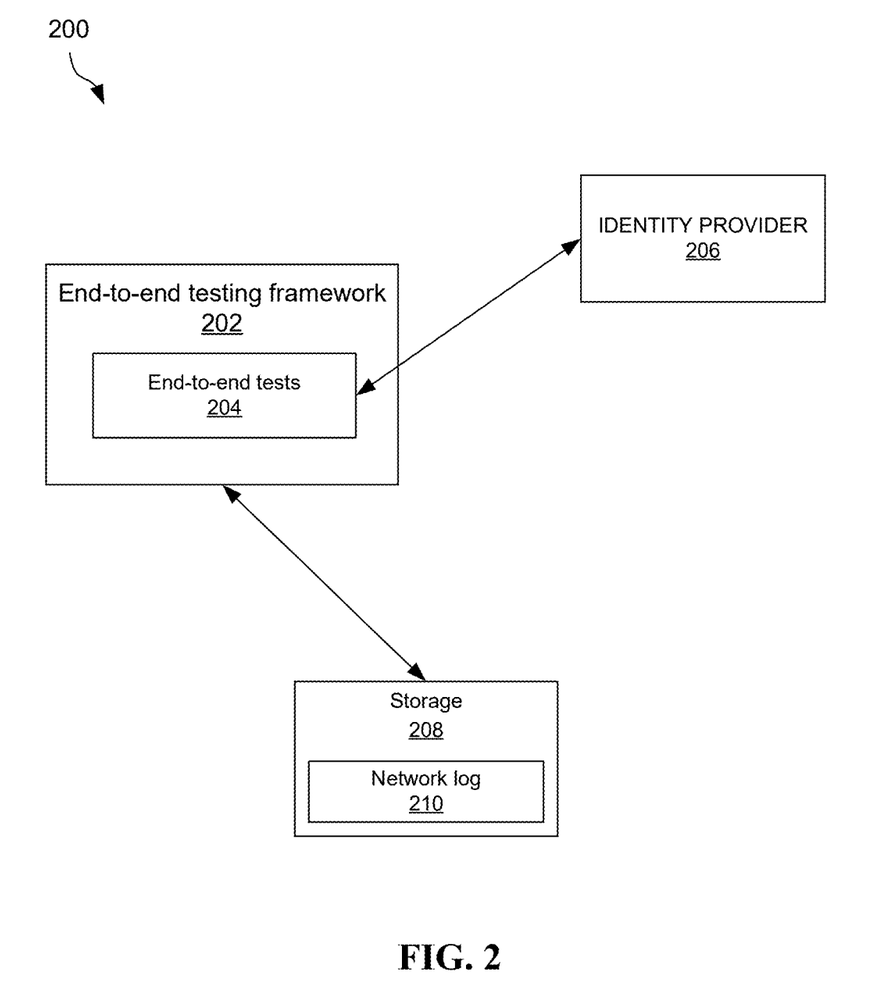
FIG. 2 illustrates a flow diagram of a system for API call authentication during an end-to-end test flow, in accordance with one embodiment.

FIG. 2 illustrates a flow diagram of a system 200 for API call authentication during an end-to-end test flow, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

The system 200 includes an end-to-end testing framework 202 that includes a plurality of end-to-end tests 204. The end-to-end tests 204 are executable to perform test flows which in combination provide end-to-end testing of a web application. One of the end-to-end tests 204 is configured to perform an authentication flow with an identity provider 206. A successful authentication flow results in the identity provider 206 returning an authentication token to the end-to-end testing framework 202.

The end-to-end testing framework 202 is configured to store a network log 210 in a defined storage 208. The end-to-end testing framework 202 may also be configured to similarly store other logs, such as browser and/or performance logs.

The defined storage 208 may be local to the end-to-end testing framework 202 or remote from the end-to-end testing framework 202. In the present embodiment, the end-to-end testing framework 202 is configured to log all metadata sent from a browser (by using any test flow) to a server. This metadata therefore contains information about request headers, including any request header that contains the authentication token.

Any end-to-end tests 204 that include a direct API call may then use the logged authentication token, as required. In an embodiment, the end-to-end testing framework 202 may parse the network log 208 to retrieve the authentication token, and then store the authentication token for local use by the direct API call. Accordingly, an end-to-end test 204 configured to make the direct API call may locally access the authentication token for use when making the direct API call.

Figure 3:
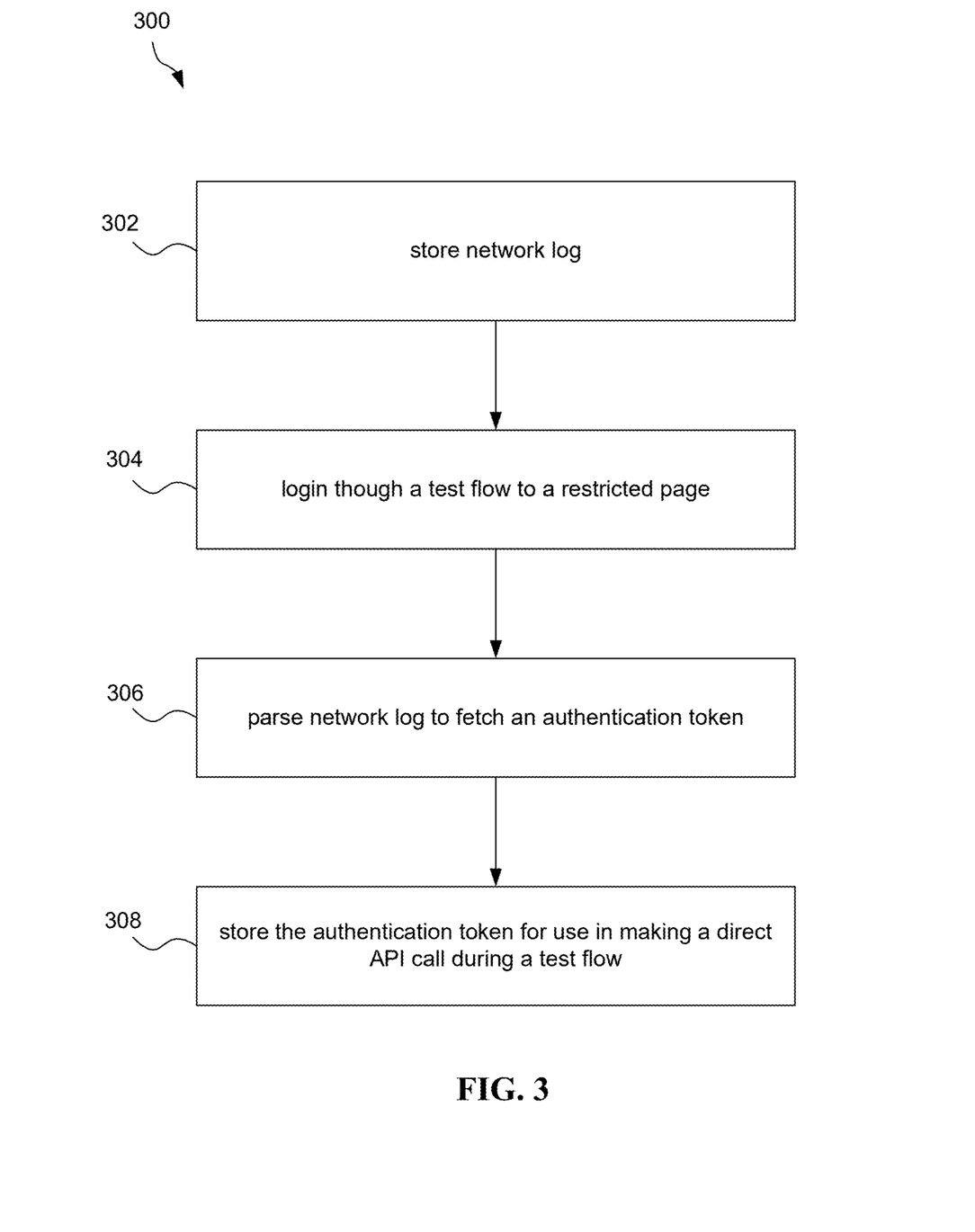
FIG. 3 illustrates a method for making an authentication token accessible to a direct API call made during an end-to-end test flow, in accordance with one embodiment.

FIG. 3 illustrates a method 300 for making an authentication token accessible to a direct API call made during an end-to-end test flow, in accordance with one embodiment. As an option, the method 300 may be carried out in the context of the details of the previous figure and/or any subsequent figure(s). For example, the method 300 may be carried out by the end-to-end testing framework 202 of FIG. 2. Of course, however, the method 300 may be carried out in the context of any desired environment. Further, the aforementioned definitions may equally apply to the description below.

Figure 4A:
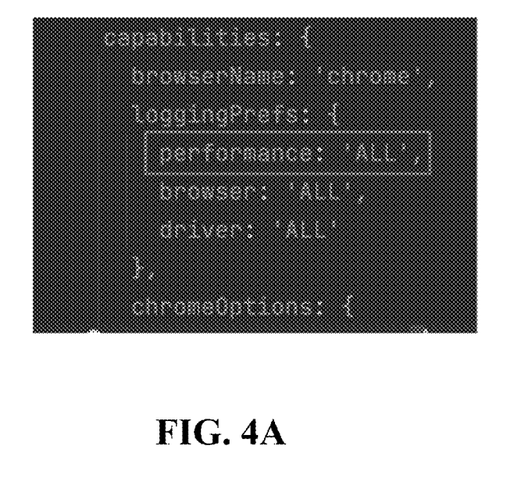
FIG. 4A illustrates an end-to-end testing framework configuration to store a network log, in accordance with one embodiment.

In operation 302, a network log is stored. The network log is caused to be stored based on a configuration of an end-to-end testing framework (see FIG. 4A for an example of the configuration). The network log is stored locally, remotely, in memory, etc. The network log contains all metadata sent from the browser (via test flows) to the server. In an embodiment, a network log may be stored per test suite of the end-to-end testing framework.

Figure 4B:
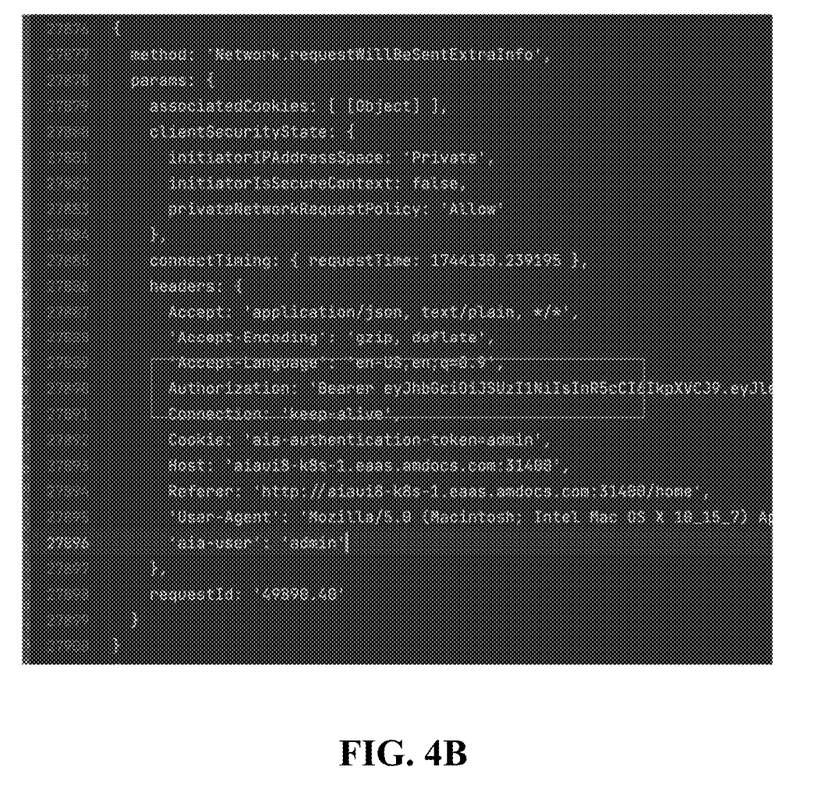
FIG. 4B illustrates an exemplary network log storing an authentication token, in accordance with one embodiment.

In operation 304, a login to a restricted page (or secured environment) is performed via a test flow. This test flow may be an authentication flow (performed via the browser), in an embodiment. A successful login causes an authentication token to be returned. As a result, metadata from network log contains information about request header that contains the authentication token (see FIG. 4B for example of the network log).

In operation 306, the network log is parsed to fetch the authentication token. For example, the network log may be scanned to fetch the authentication token. In operation 308, the authentication token is stored for use in making a direct API call during a test flow. For example, the authentication token may be stored in an instanced for being accessed during the test flow, as required to make the direct API call. Once the authentication token is stored an accessible to API test flows, the API test flows may be executed as part of the end-to-end testing.

Embodiments

The embodiments described herein may reduce a time of end-to-end test execution by using direct API calls in a complex scenario.

The embodiments described herein may dramatically reduce a time to detect performance issues.

The embodiments described herein may provide an ability to test cross-communication platforms by using authentication tokens.

The embodiments described herein may create an ability to test API calls-by using performance logs which contains key performance indicator (KPI) timestamp between different API's (e.g. which can be useful in regression tests).

The embodiments described herein may create an ability to predict memory leaks by using network/browser/performance logs.

The embodiments described herein may use machine learning algorithms to predict the most sensitive places in a code for complex scenarios to be covered via a test suite of the end-to-end testing framework. By using machine learning, optimization areas may be suggested through the runtime.

Figure 5:
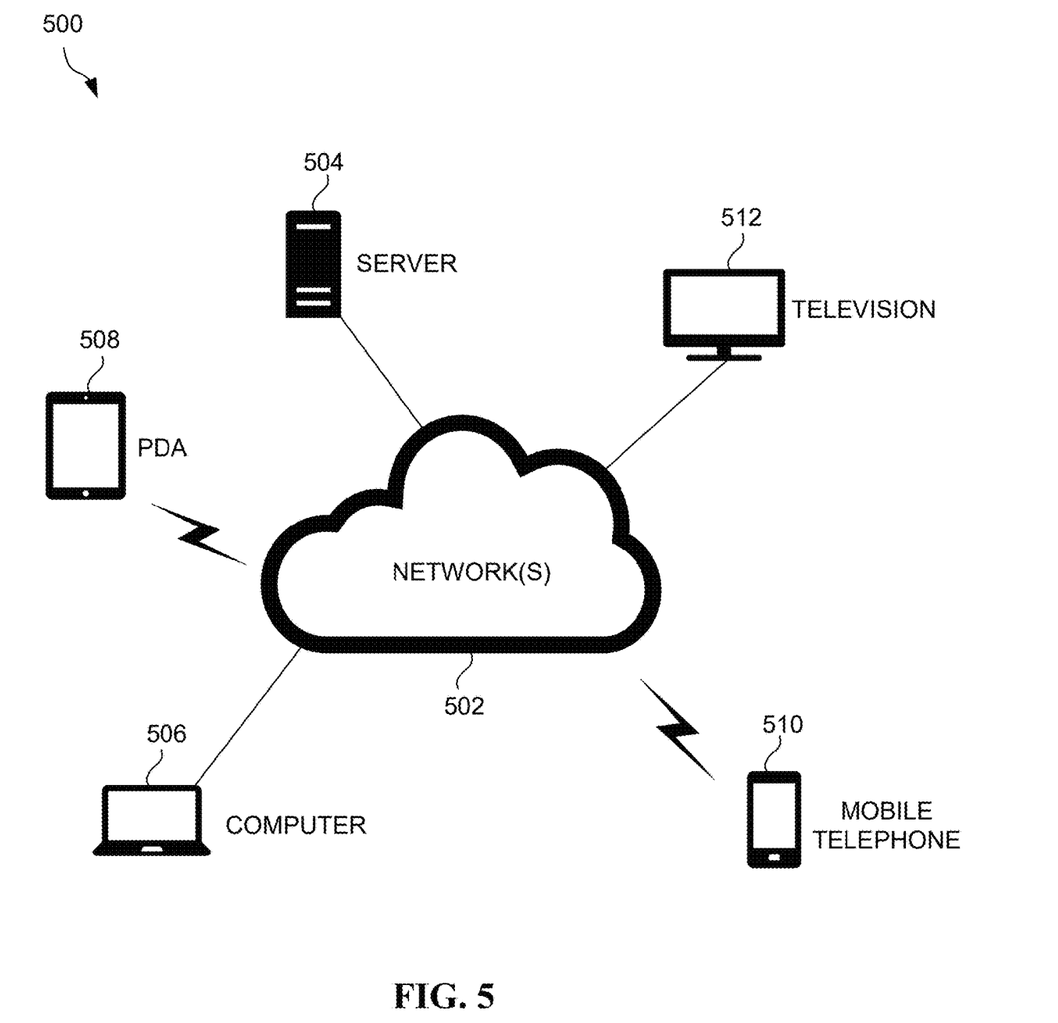
FIG. 5 illustrates a network architecture, in accordance with one possible embodiment.
Figure 6:
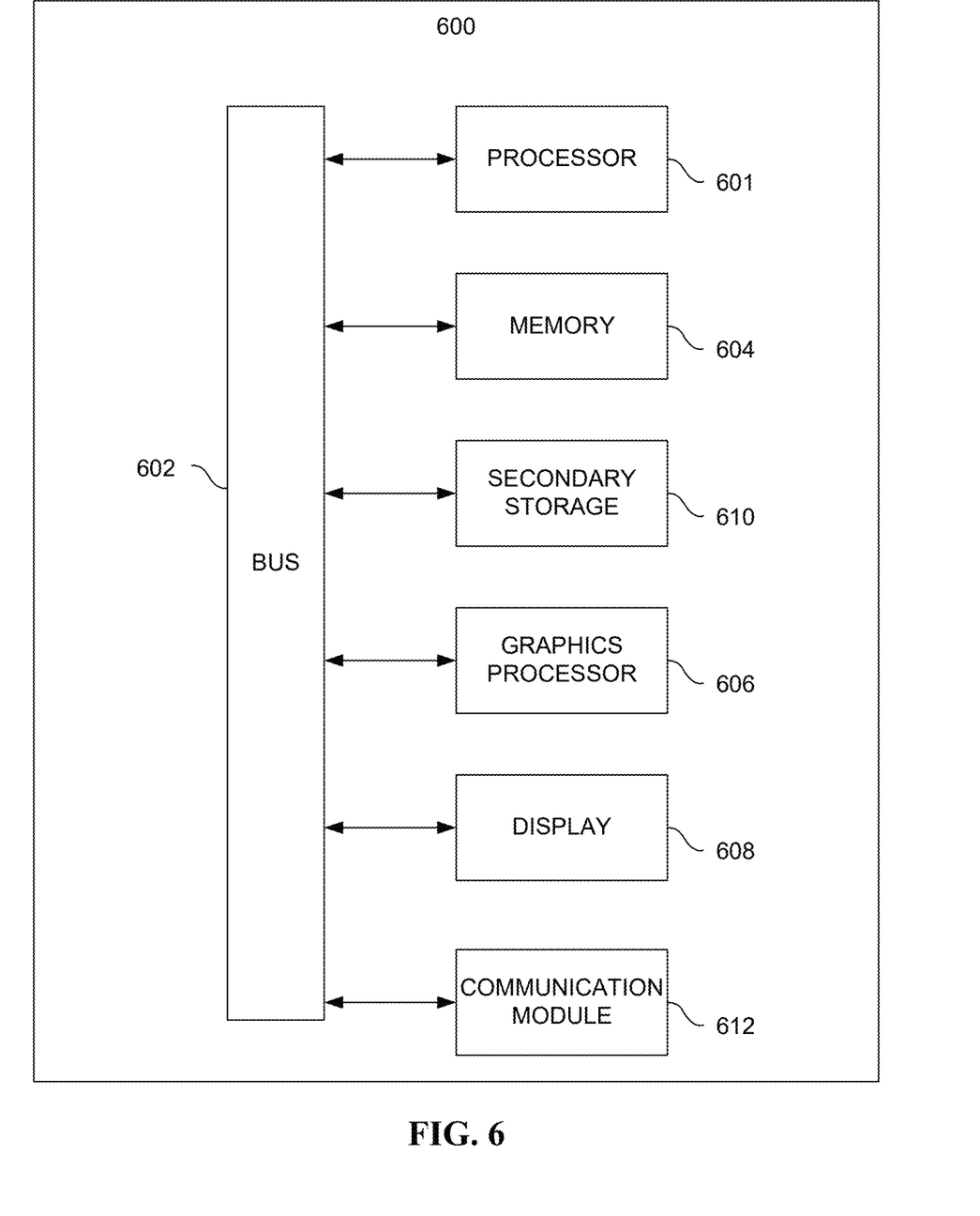
FIG. 6 illustrates an exemplary system, in accordance with one embodiment.

FIG. 5 illustrates a network architecture 500, in accordance with one possible embodiment. As shown, at least one network 502 is provided. In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 504 and an end user computer 506 may be coupled to the network 502 for communication purposes. Such end user computer 506 may include a desktop computer, lap-top computer, and/or any other type of logic. Still yet, various other devices may be coupled to the network 502 including a personal digital assistant (PDA) device 508, a mobile phone device 510, a television 512, etc.

FIG. 6 illustrates an exemplary system 600, in accordance with one embodiment. As an option, the system 600 may be implemented in the context of any of the devices of the network architecture 500 of FIG. 5. Of course, the system 600 may be implemented in any desired environment.

As shown, a system 600 is provided including at least one central processor 601 which is connected to a communication bus 602. The system 600 also includes main memory 604 [e.g. random access memory (RAM), etc.]. The system 600 also includes a graphics processor 606 and a display 608.

The system 600 may also include a secondary storage 610. The secondary storage 610 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 604, the secondary storage 610, and/or any other memory, for that matter. Such computer programs, when executed, enable the system 600 to perform various functions (as set forth above, for example). Memory 604, storage 610 and/or any other storage are possible examples of non-transitory computer-readable media.

The system 600 may also include one or more communication modules 612. The communication module 612 may be operable to facilitate communication between the system 600 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:
   during use of an end-to-end testing framework to test a web application, cause a browser to execute a first test of the end-to-end testing framework, wherein the execution of the first test causes the browser to:
      log in to a secured environment and in return obtain an authentication token issued by an identity provider, and
      communicate a request header that includes the authentication token to the end-to-end testing framework;
   receive, by the end-to-end testing framework from the browser as a part of the first test, a communication with the request header that includes the authentication token;
   log, by the end-to-end testing framework in a network log of the end-to-end testing framework, the communication with the authentication token issued by the identity provider;
   for a second test of the end-to-end testing framework that includes a direct API call, parse, by the end-to-end testing framework, the network log to retrieve the authentication token;
   store, by the end-to-end testing framework, the authentication token in a local storage for local use by the direct API call;
   execute, by the end-to-end testing framework, the second test of the end-to-end testing framework that:
      accesses the authentication token from the local storage, and
      makes the direct API call with the authentication token to authenticate a source of the direct API call with a recipient of the direct API call.

2. The non-transitory computer-readable media of claim 1, wherein the network log is stored in remote memory.

3. A method, comprising:
   at a computer system:
   during use of an end-to-end testing framework to test a web application, causing a browser to execute a first test of the end-to-end testing framework, wherein the execution of the first test causes the browser to:
      log in to a secured environment and in return obtain an authentication token issued by an identity provider, and
      communicate a request header that includes the authentication token to the end-to-end testing framework;
   receiving, by the end-to-end testing framework from the browser as a part of the first test, a communication with the request header that includes the authentication token;
   logging, by the end-to-end testing framework in a network log of the end-to-end testing framework, the communication with the authentication token issued by the identity provider;
   for a second test of the end-to-end testing framework that includes a direct API call, parsing, by the end-to-end testing framework, the network log to retrieve the authentication token;
   storing, by the end-to-end testing framework, the authentication token in a local storage for local use by the direct API call;
   executing, by the end-to-end testing framework, the second test of the end-to-end testing framework that:
      accesses the authentication token from the local storage, and
      makes the direct API call with the authentication token to authenticate a source of the direct API call with a recipient of the direct API call.

4. The method of claim 3, wherein the network log is stored in remote memory.

5. A system, comprising:
   a non-transitory memory storing instructions; and
   one or more processors in communication with the non-transitory memory that execute the instructions to:
   during use of an end-to-end testing framework to test a web application, cause a browser to execute a first test of the end-to-end testing framework, wherein the execution of the first test causes the browser to:
      log in to a secured environment and in return obtain an authentication token issued by an identity provider, and
      communicate a request header that includes the authentication token to the end-to-end testing framework;
   receive, by the end-to-end testing framework from the browser as a part of the first test, a communication with the request header that includes the authentication token;
   log, by the end-to-end testing framework in a network log of the end-to-end testing framework, the communication with the authentication token issued by the identity provider;
   for a second test of the end-to-end testing framework that includes a direct API call, parse, by the end-to-end testing framework, the network log to retrieve the authentication token;

store, by the end-to-end testing framework, the authentication token in a local storage for local use by the direct API call;

execute, by the end-to-end testing framework, the second test of the end-to-end testing framework that:
   accesses the authentication token from the local storage, and
   makes the direct API call with the authentication token to authenticate a source of the direct API call with a recipient of the direct API call.

\* \* \* \* \*